US012262185B2

(12) United States Patent
Kim et al.

(10) Patent No.: US 12,262,185 B2
(45) Date of Patent: Mar. 25, 2025

(54) SMART SPEAKER AND METHOD FOR PROVIDING SOUND USING THE SAME

(71) Applicants: Hyundai Motor Company, Seoul (KR); Kia Corporation, Seoul (KR)

(72) Inventors: Ki Chang Kim, Suwon-si (KR); Dong Chul Park, Anyang-si (KR)

(73) Assignees: Hyundai Motor Company, South (KR); Kia Corporation, South (KR)

( * ) Notice: Subject to any disclaimer, the term of this patent is extended or adjusted under 35 U.S.C. 154(b) by 153 days.

(21) Appl. No.: 17/884,858

(22) Filed: Aug. 10, 2022

(65) Prior Publication Data

US 2023/0262392 A1 Aug. 17, 2023

(30) Foreign Application Priority Data

Feb. 14, 2022 (KR) ........................ 10-2022-0019145

(51) Int. Cl.
*H04R 3/12* (2006.01)
*H04R 1/02* (2006.01)
(Continued)

(52) U.S. Cl.
CPC ............... *H04R 3/12* (2013.01); *H04R 1/023* (2013.01); *H04R 1/025* (2013.01); *H04R 1/24* (2013.01);
(Continued)

(58) Field of Classification Search
CPC .......... H04R 3/12; H04R 1/023; H04R 1/025; H04R 1/24; H04R 1/323; H04R 2201/025; H04R 2499/13; H04R 3/14; H04R 5/04; H04R 2201/021; H04R 1/345; H04R 5/02; H04R 2205/024; H04R 2430/01;
(Continued)

(56) References Cited

U.S. PATENT DOCUMENTS 4,953,223 A * 8/1990 Householder ............ H04R 1/26 381/387
7,441,630 B1 * 10/2008 Herrington ............ H04R 1/026 181/198
(Continued)

FOREIGN PATENT DOCUMENTS

CN 108347669 A * 7/2018 ............... H04R 1/02
CN 113630692 A * 11/2021 ............. H04R 1/323
(Continued)

OTHER PUBLICATIONS

Hong, Joo Young, et al., "Influence of Urban Contexts on Soundscape Perceptions: A Structural Equation Modeling Approach", Landscape and Urban Planning, vol. 141, Sep. 2015, 2 pages.

*Primary Examiner* — Oyesola C Ojo
(74) *Attorney, Agent, or Firm* — Slater Matsil, LLP

(57) ABSTRACT

An embodiment smart speaker includes a motor configured to rotate a rotary shaft, a speaker housing connected with the rotary shaft, a first speaker mounted on an inclined surface disposed on an upper end of the speaker housing, a second speaker mounted on a vertical surface of the speaker housing, a cover configured to protect the first speaker and the second speaker, and a controller configured to control a rotation of the first speaker and the second speaker using the motor to radiate a sound in at least one target direction.

20 Claims, 11 Drawing Sheets

(51) Int. Cl.
*H04R 1/24* (2006.01)
*H04R 1/32* (2006.01)

(52) U.S. Cl.
CPC ....... *H04R 1/323* (2013.01); *H04R 2201/025* (2013.01); *H04R 2499/13* (2013.01)

(58) Field of Classification Search
CPC .. H04R 1/403; H04R 1/028; H04R 2201/028; H04S 7/302
See application file for complete search history.

(56) References Cited

U.S. PATENT DOCUMENTS

| | | | | |
|---|---|---|---|---|
| 8,229,155 | B2 * | 7/2012 | Maurer | H04R 1/26 381/387 |
| 9,591,399 | B1 * | 3/2017 | Wu | H04R 1/345 |
| 10,206,029 | B2 | 2/2019 | Song et al. | |
| 10,645,494 | B1 * | 5/2020 | Oh | G10L 15/22 |
| 10,873,797 | B2 * | 12/2020 | Winton | H04R 1/026 |
| 10,911,865 | B2 | 2/2021 | Sullivan et al. | |
| 11,095,976 | B2 * | 8/2021 | Kim | H04R 1/403 |
| 11,128,947 | B2 * | 9/2021 | Darling | H04R 1/22 |
| 11,166,090 | B2 * | 11/2021 | Alexander | H04R 9/063 |
| 11,647,323 | B2 * | 5/2023 | Dyreby | H04R 1/288 381/335 |
| 2005/0035246 | A1 * | 2/2005 | Coleman | F16M 11/18 248/349.1 |
| 2006/0225950 | A1 * | 10/2006 | Ishida | H04R 1/021 181/199 |
| 2007/0140508 | A1 * | 6/2007 | Soerensen | H04N 5/642 381/87 |
| 2007/0144826 | A1 * | 6/2007 | An | H04R 1/26 181/148 |
| 2008/0095395 | A1 * | 4/2008 | Pieklik | A61H 33/60 381/189 |
| 2016/0088386 | A1 * | 3/2016 | Crosswell | H04R 1/025 381/349 |
| 2017/0006374 | A1 | 1/2017 | Song et al. | |
| 2017/0238090 | A1 * | 8/2017 | Johnson | H04R 1/025 381/335 |
| 2021/0380055 | A1 * | 12/2021 | Kim | B60R 16/023 |

FOREIGN PATENT DOCUMENTS

| | | | |
|---|---|---|---|
| JP | 2006067386 | A | 3/2006 |
| KR | 20170004700 | A | 1/2017 |

* cited by examiner

■ : SPEAKER POSITION
● : SEATING POSITION
○ : SOUND IMAGE POSITION

SMART SPEAKER AND METHOD FOR PROVIDING SOUND USING THE SAME

CROSS-REFERENCE TO RELATED APPLICATIONS

This application claims the benefit of Korean Patent Application No. 10-2022-0019145, filed on Feb. 14, 2022, which application is hereby incorporated herein by reference.

TECHNICAL FIELD

The present disclosure relates to a smart speaker and a method for providing a sound using the same.

BACKGROUND

A speaker has directionality and emits (or radiates) a sound (or a sound wave or the like) in a direction where a unit is located. The speaker is divided into a unidirectional speaker, a bidirectional speaker, and an omnidirectional speaker according to a speaker arrangement scheme. The omnidirectional speaker among them radiates a sound in all directions such that a user hears a good sound without having to face the speaker surface. Furthermore, the omnidirectional speaker is used for the sound of a cafe because it is possible to implement a natural tone and a wide and deep sound field pursued by a high-end audio.

To implement the high end audio in a cafe in the vehicle, a 5-way speaker system is previously applied. The 5-way speaker system includes a subwoofer, a tweeter, a woofer, and a mid-range speaker (or a mid-range) and adjusts a sound image (or a sound imagery) position. However, the existing 5-way speaker system has technical limitations in adjusting reference positions of the driver's seat and the rear very important person (VIP) seat due to a sound image distortion.

SUMMARY

Embodiments of the present disclosure can solve problems occurring in the prior art while advantages achieved by the prior art are maintained intact.

An embodiment of the present disclosure provides a smart speaker for rotating a tweeter disposed at an incline and a hybrid woofer in which a mid-range speaker and a subwoofer are combined with each other, which is vertically disposed, with respect to a rotary shaft to radiate a sound in a target direction or all directions and a method for providing a sound using the same.

Another embodiment of the present disclosure provides a smart speaker for identifying the number of passengers who ride in a vehicle and seating positions of the passengers and adjusting a sound image position and a method for providing a sound using the same.

The technical problems to be solved by embodiments of the present disclosure are not limited to the aforementioned problems, and any other technical problems not mentioned herein will be clearly understood from the following description by those skilled in the art to which the present disclosure pertains.

According to an embodiment of the present disclosure, a smart speaker may include a motor that rotates a rotary shaft in one direction, a speaker housing formed by being connected with the rotary shaft, a first speaker mounted on an inclined surface formed on an upper end of the speaker housing, a second speaker mounted on a vertical surface of the speaker housing, a cover that protects the first speaker and the second speaker, and a controller that controls a rotation of the first speaker and the second speaker by means of the motor to radiate a sound in at least one target direction.

The first speaker may be a ring radiator tweeter.

The second speaker may be a hybrid woofer in which a subwoofer and a mid-range speaker are combined with each other.

The cover may be made of polypropylene.

The smart speaker may further include a wrinkle part formed on the cover. A light may be disposed on the wrinkle part.

The controller may determine a control mode and a sound image position based on riding information in a vehicle.

The control mode may be divided into a sound image position fixing mode and a sound image position rotation mode.

The controller may set the determined one sound image position to a target direction and may control the first speaker and the second speaker to radiate a sound in the target direction, when the control mode is the sound image position fixing mode.

The controller may set the at least two determined sound image positions to target directions and may control the first speaker and the second speaker to radiate a sound in the target directions, when the control mode is the sound image position rotation mode.

The smart speaker may be mounted on a holder provided in a console box of a vehicle.

According to another embodiment of the present disclosure, a method for providing a sound using a smart speaker including a first speaker and a second speaker rotatably installed with respect to a rotary axis may include obtaining riding information in a vehicle, determining a control mode based on the riding information in the vehicle, determining a sound image position based on the control mode and a seating position, and controlling a sound output of the smart speaker based on the determined sound image position.

The obtaining of the riding information in the vehicle may include receiving the riding information in the vehicle, the riding information being transmitted from a vehicle terminal.

The determining of the control mode may include determining the control mode as a sound image position fixing mode, when the number of passengers included in the riding information in the vehicle is less than or equal to two and determining the control mode as a sound image position rotation mode, when the number of the passengers is greater than two.

The determining of the sound image position may include determining one sound image position based on a seating position included in the riding information in the vehicle, when the sound image position fixing mode is determined, and determining at least two sound image positions based on the seating position, when the sound image position rotation mode is determined.

The controlling of the sound output of the smart speaker may include rotating and moving the first speaker and the second speaker such that the first speaker and the second speaker face the one sound image position, when the one sound image position is determined.

The controlling of the sound output of the smart speaker may include rotating the first speaker and the second speaker such that the first speaker and the second speaker face the at least two sound image positions, when the at least two sound image positions are determined.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
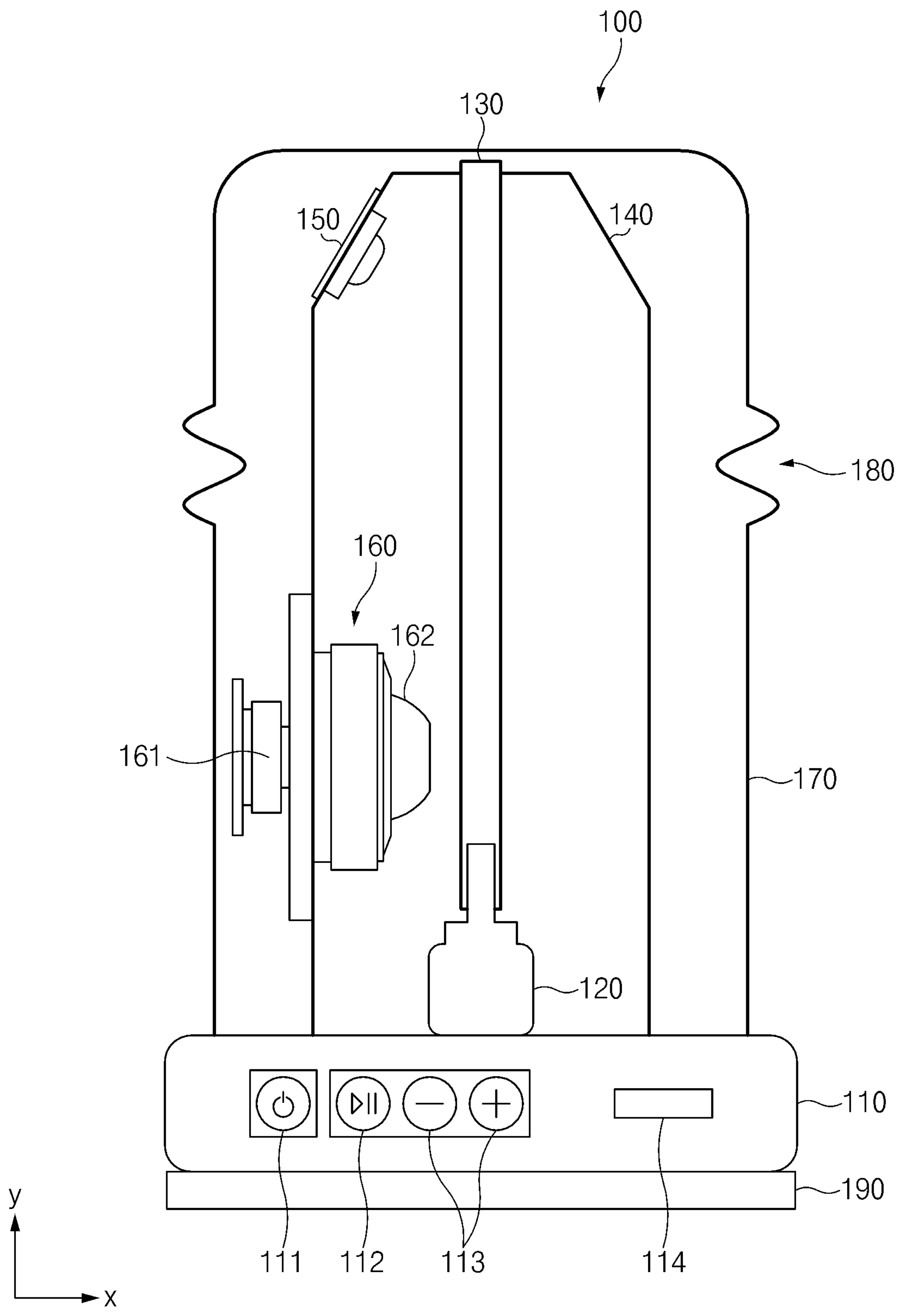
FIG. 1 is a perspective view illustrating a smart speaker according to embodiments of the present disclosure.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be omitted in order not to unnecessarily obscure the gist of the present disclosure.

In describing the components of the embodiments according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which this invention belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a perspective view illustrating a smart speaker according to embodiments of the present disclosure.

Referring to FIG. 1, a smart speaker 100 may include a lower case 110, a motor 120, a rotary shaft 130, a speaker housing 140, a first speaker 150, a second speaker 160, a cover 170, a wrinkle part 180, and a buffer pad 190.

The lower case 110 may be in the form of a pillar, and a receiving space may be provided in the lower case 110. A controller, a battery, a microphone, a light controller, a charge and discharge circuit, a communication circuit, and the like may be provided in the receiving space of the lower case 110.

Control buttons, such as a power button 111, a play and stop button 112, a volume button 113, and a mode selection button 114, may be arranged on a portion of an outer side of the lower case 110. Furthermore, a connection port (not shown) capable of connecting a charging cable may be provided in an outer side or a lower surface of the lower case 110.

The motor 120 may be mounted on the center of an upper surface of the lower case 110. The motor 120 may be driven by power supplied from a battery (not shown). The motor 120 may be implemented as a small direct current (DC) motor.

The rotary shaft 130 may be connected with the motor 120 to rotate in one direction depending on the driving of the motor 120. In other words, a rotational direction and a rotational speed of the rotary shaft 130 may be determined by a rotational direction and a rotational speed of the motor 120.

The speaker housing 140 may be formed by being connected with the rotary shaft 130 and may be rotated by rotational motion of the rotary shaft 130. An inclined surface (or a tapered surface) may be formed at an upper surface of the speaker housing 140. Furthermore, a vertical surface may be formed by being connected with the inclined surface of the speaker housing 140.

The first speaker 150 may be mounted on the inclined surface formed on the upper end of the speaker housing 140. The first speaker 150 may be implemented as a tweeter for high frequency. For example, the first speaker 150 may be implemented as a ring radiator tweeter. The first speaker 150 may implement a radial sound field by the rotary shaft 130. The first speaker 150 may be used to set a sound image position.

The second speaker 160 may be mounted on the vertical surface of the speaker housing 140. The second speaker 160 may be implemented as a hybrid woofer in which a mid-range speaker 161 and a subwoofer 162 are combined with each other. The second speaker 160 may be made of Kevlar to have a natural sound color with excellent transparency, sense of space, and resolution. The second speaker 160 may implement a horizontal stereophonic sound by the rotary shaft 130. The second speaker 160 may be movably installed along the vertical surface of the speaker housing 140. Thus, the height of the second speaker 160 may be set to implement a mid-to-low stereophonic sound.

The cover 170 may serve to protect the first speaker 150 and the second speaker 160 from the outside. The cover 170 may be made of a material such as polypropylene.

The wrinkle part 180 may be formed on an outer peripheral surface of the cover 170. A light such as a light emitting diode (LED) may be disposed on the wrinkle part 180.

The buffer pad 190 may be disposed on a rear surface of the lower case 110. The buffer pad 190 may absorb an impact applied from a lower part to reduce the impact delivered to the first speaker 150 and the second speaker 160.

Figure 2:
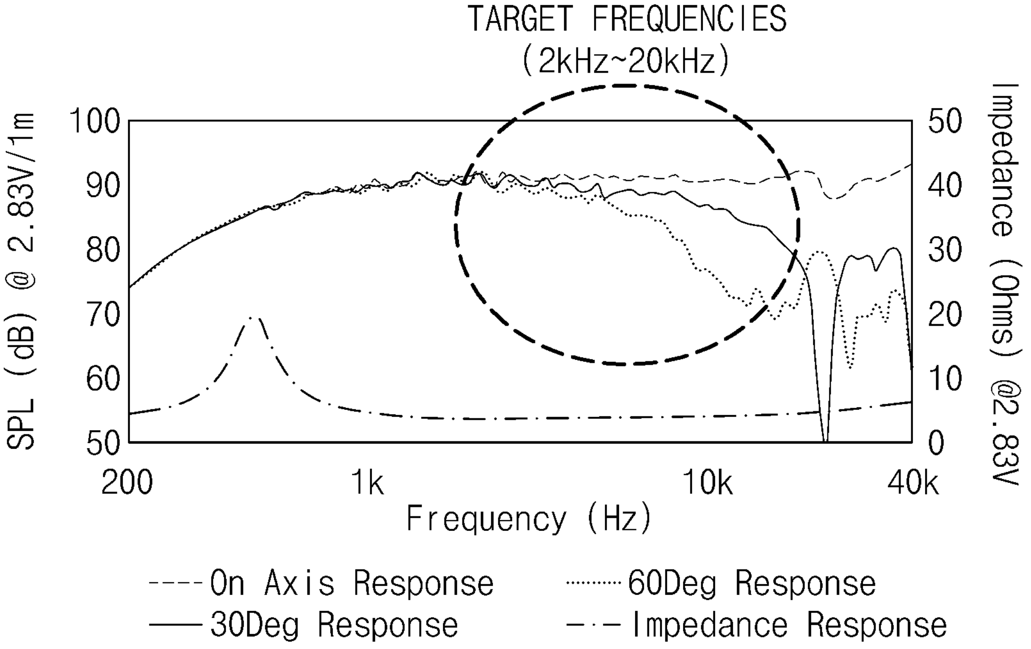
FIG. 2 illustrates a frequency response and impedance characteristic graph of a first speaker shown in FIG. 1.
Figure 3:
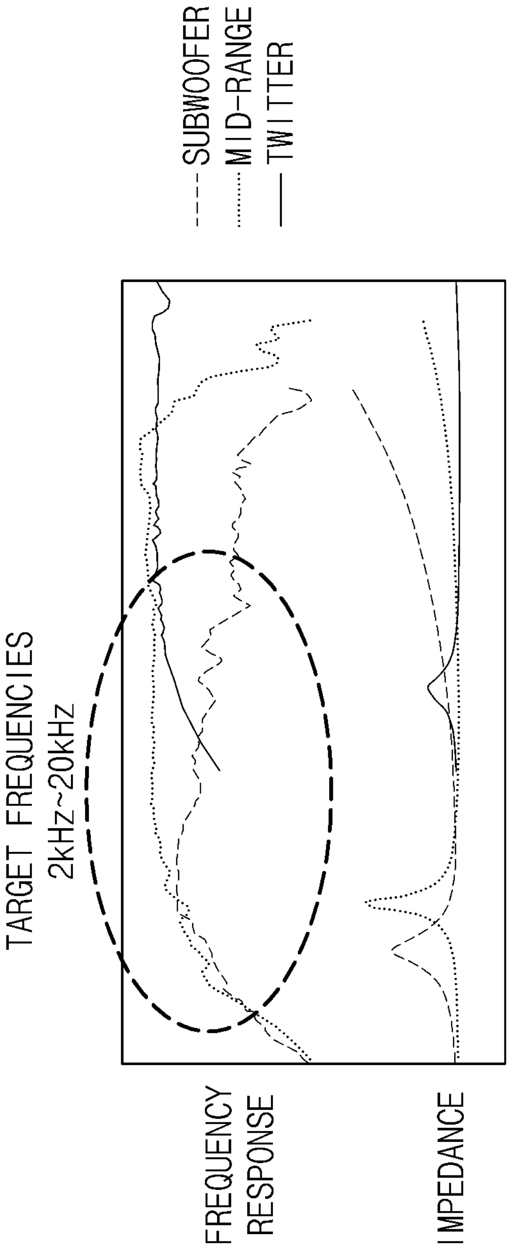
FIG. 3 illustrates a frequency response and impedance characteristic graph of a second speaker shown in FIG. 1.

FIG. 2 illustrates a frequency response and impedance characteristic graph of a first speaker shown in FIG. 1. FIG. 3 illustrates a frequency response and impedance characteristic graph of a second speaker shown in FIG. 1.

Referring to FIG. 2, when a first speaker 150 of FIG. 1, that is, a tweeter is mounted on an inclined surface of 30 degrees and on an inclined surface of 60 degrees, it may be seen that the first speaker 150 quantitatively well plays a sound pressure level (SPL) [dB] for each frequency in a region of target frequencies (2 KHz~20 KHz). An impedance of the first speaker 150 may be an electrical resistance of the speaker. The lower the impedance, the better the current flows.

According to a frequency response characteristic graph of a second speaker 160 of FIG. 1, that is, a hybrid woofer, which is shown in FIG. 3, it may be seen that the second speaker 160 quantitatively well plays a sound pressure level (SPL) [dB] for each frequency in the region of the target frequencies (2 KHz~20 KHz).

Figure 4:
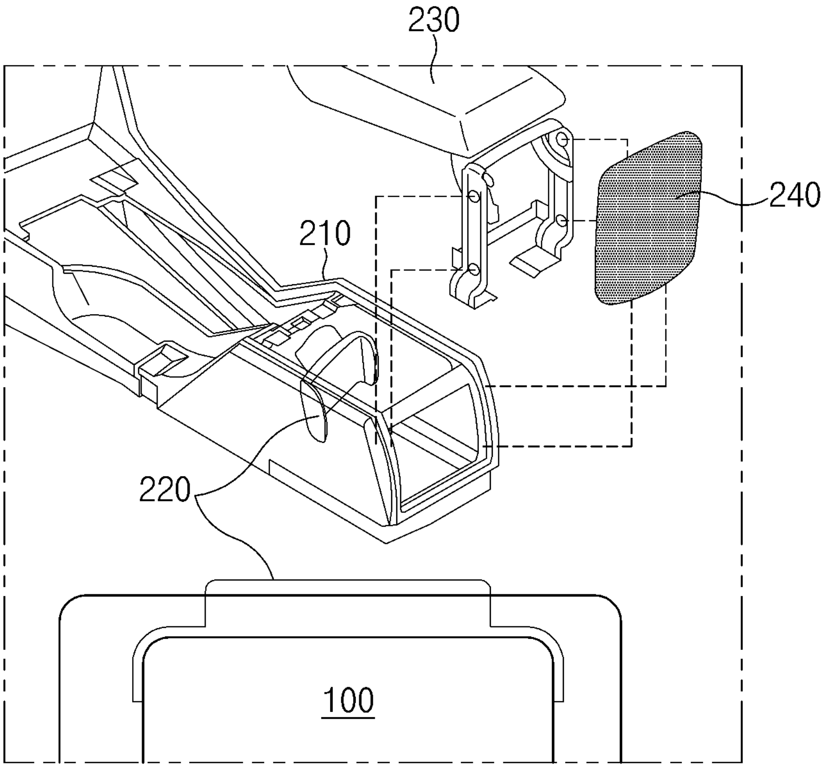
FIG. 4 is a drawing illustrating a structure in which a smart speaker is mounted on a vehicle according to embodiments of the present disclosure.

FIG. 4 is a drawing illustrating a structure in which a smart speaker is mounted on a vehicle according to embodiments of the present disclosure.

As shown in FIG. 4, a smart speaker 100 may be mounted on a console box 210 of the vehicle. A receiving space may be provided in the console box 210, and a holder 220 may be mounted on a vertical surface at an inner side of the receiving space. A vertical surface of the smart speaker 100 may be received on the holder 220, and a lower end of the smart speaker 100 may be closely attached to the bottom surface of the receiving space of the console box 210. A lid 230 may be located on an upper portion of the console box 210 and may be upwardly rotatably installed on the upper portion of the console box 210. A cover 240 capable of transmitting a sound may be provided in a rear surface of the console box 210. The present embodiment illustrates that the cover 240 capable of transmitting a sound is provided in only the rear surface of the console box 210, but the embodiments are not limited thereto. A front surface of the console box 210 may be implemented to transmit a sound.

Figure 5:
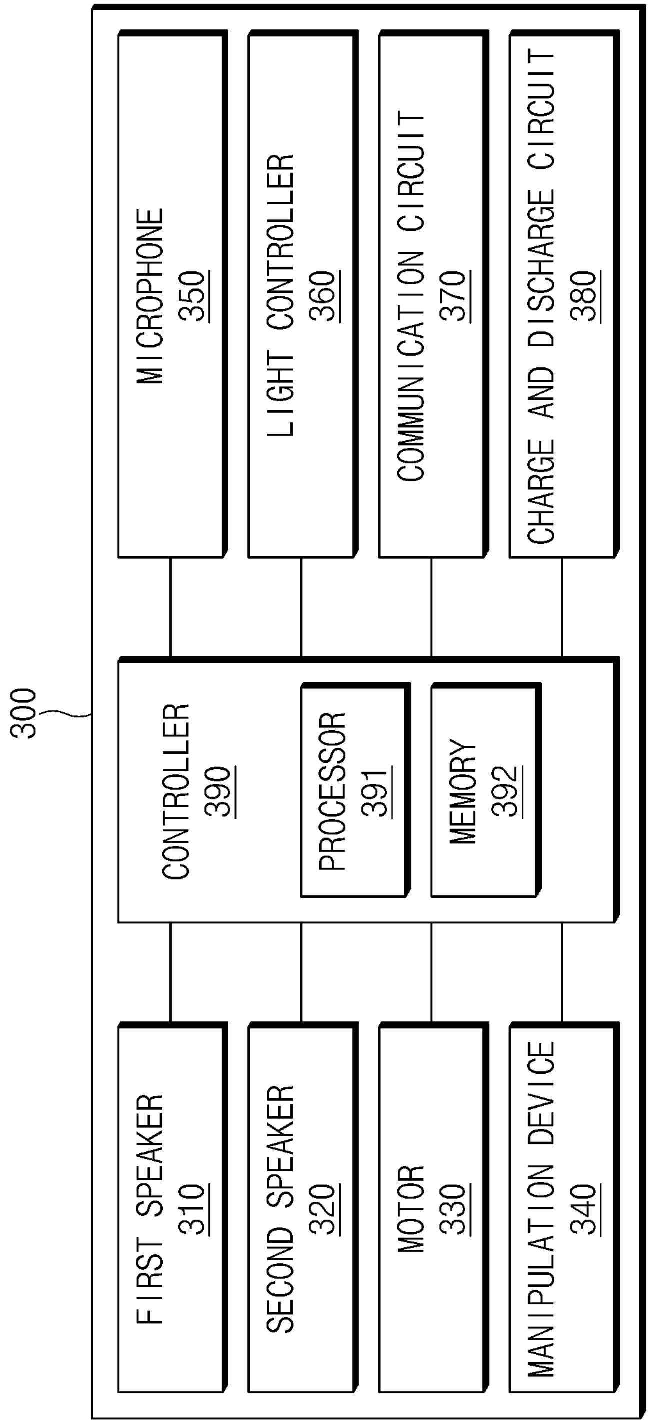
FIG. 5 is a block diagram illustrating a configuration of a smart speaker according to embodiments of the present disclosure.
Figure 6:
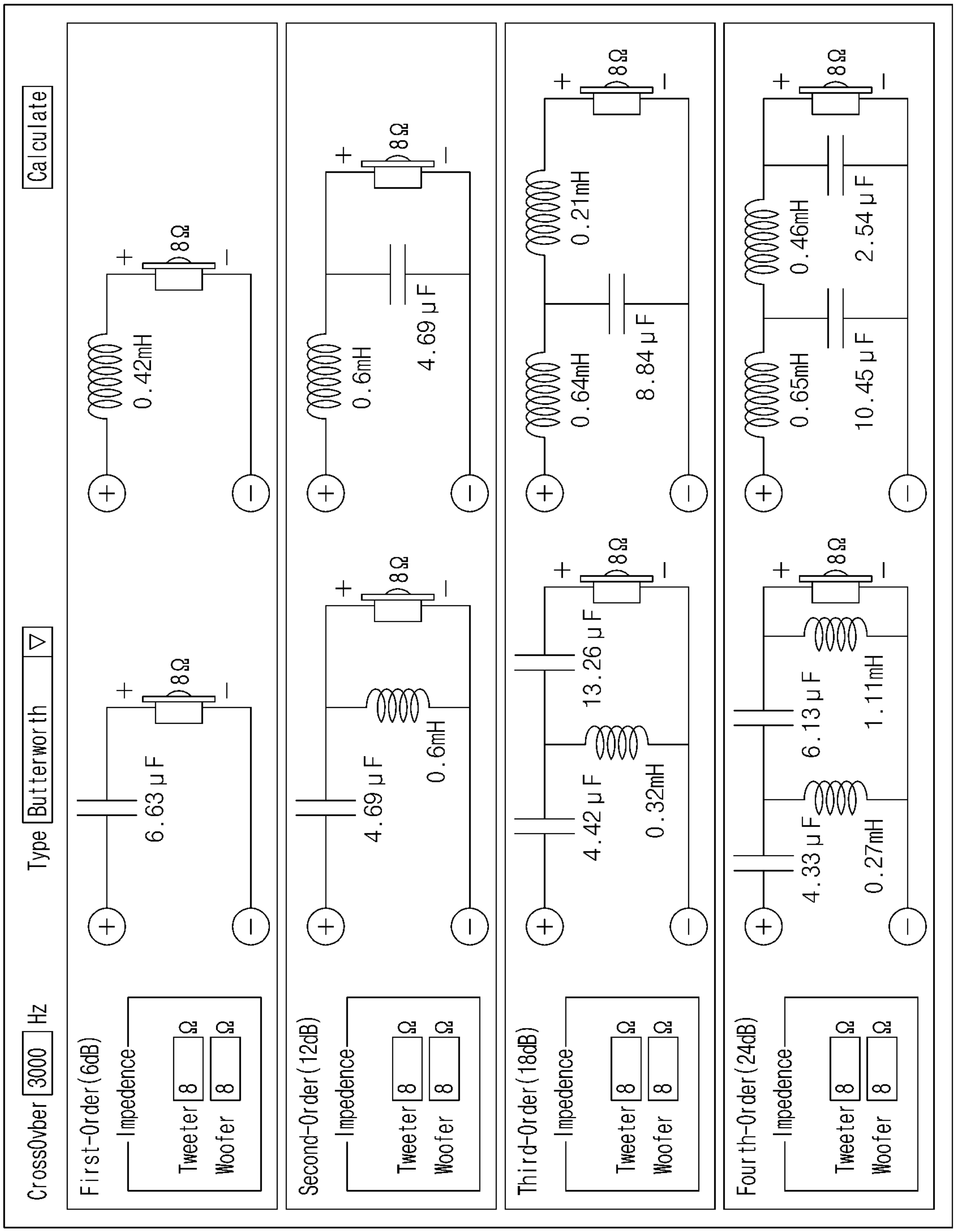
FIG. 6 is a drawing illustrating a fourth-order network function associated with embodiments of the present disclosure.

FIG. 5 is a block diagram illustrating a configuration of a smart speaker according to embodiments of the present disclosure. FIG. 6 is a drawing illustrating a fourth-order network function associated with embodiments of the present disclosure.

Referring to FIG. 5, a smart speaker 300 may include a first speaker 310, a second speaker 320, a motor 330, a manipulation device 340, a microphone 350, a light controller 360, a communication circuit 370, a charge and discharge circuit 380, and a controller 390. Herein, the first speaker 310, the second speaker 320, the motor 330, and the manipulation device 340 may correspond to a first speaker 150, a second speaker 160, a motor 120, and control buttons 111 to 114, respectively.

The first speaker 310 may be a tweeter which radiates a high-frequency sound, which may implement a radial sound field. The first speaker 310 may be used to set a sound image position.

The second speaker 320 may be a hybrid woofer, which may implement a mid-to-low stereophonic sound. The second speaker 320 may rotate together with the first speaker 310 in one direction with respect to a rotary shaft.

The motor 330 may rotate the rotary shaft in one direction under an instruction of the controller 390. The motor 330 may adjust a rotational speed, a rotational direction, and the like of the rotary shaft depending on a control command transmitted from the controller 390.

The manipulation device 340 may generate data (or a signal) depending on manipulation of a user. The manipulation device 340 may include control buttons such as a power button 111, a play and stop button 112, a volume button 113, and a mode selection button 114 of FIG. 1. The control buttons 111 to 114 may be implemented as buttons, switches, touch buttons, and/or the like.

The microphone 350 may receive and convert a sound wave into an electrical signal. The microphone 350 may separate and output at least one of a voice signal, a background sound, or music from the received audio signal using an artificial intelligence algorithm (or an emotional and environmental cognitive technology).

The light controller 360 may control a color, a brightness, turn-on, turn-off, and the like of a light depending on a control command of the controller 390. The light controller 360 may convert power supplied from a battery (not shown) into power necessary to drive the light and may control the light such that power may be stably supplied to the light.

The communication circuit 370 may support communication between the smart speaker 300 and an external device. The external device may include a vehicle terminal, such as an audio video navigation (AVN) and an infotainment terminal, a mobile terminal, such as a smartphone, and/or the like. The communication circuit 370 may include a wireless communication circuit (e.g., a Wi-Fi communication circuit, a Bluetooth communication circuit, a near field communication (NFC) circuit, an international mobile telecommunication (IMT)-2020 communication circuit, and/or the like), a wired communication circuit (e.g., an Ethernet communication circuit, a controller area network (CAN) communication circuit, a local area network (LAN) communication circuit, and/or the like), and/or the like.

The charge and discharge circuit 380 may control charging or discharging of the battery mounted on the smart speaker 300. When a charging cable is connected with a connection port provided in an outer side, a rear surface, or the like of a lower case 110 shown in FIG. 1, the charge and discharge circuit 380 may charge the battery using power supplied through the charging cable. Furthermore, the charge and discharge circuit 380 may supply power necessary to operate components in the smart speaker 300 using electrical energy stored in the battery.

The controller 390 may control the overall operation of the smart speaker 300. The controller 390 may include a processor 391, a memory 392, and the like. The processor 391 may perform a predetermined operation of the controller 390. The processor 391 may include at least one of processing devices such as an application specific integrated circuit (ASIC), a digital signal processor (DSP), a programmable logic device (PLD), a field programmable gate array (FPGA), a central processing unit (CPU), a microcontroller, or a microprocessor. The memory 392 may be a non-transitory storage medium which stores instructions executed by the processor 391. The memory 392 may store a sound source, setting information, control logic, and/or the like. The memory 392 may be implemented as at least one of storage media such as a flash memory, a hard disk, a solid state disk (SSD), a secure digital (SD) card, a random access memory (RAM), a static RAM (SRAM), a read only memory (ROM), a programmable ROM (PROM), an electrically erasable and programmable ROM (EEPROM), or an erasable and programmable ROM (EPROM).

When a sound image position fixing mode or a sound image position rotation mode is selected by the mode selection button 114, the controller 390 may control an operation of the motor 330 based on the selected mode.

When the sound image position fixing mode is selected, the controller 390 may rotate the first speaker 310 and the second speaker 320 to fix a sound image position to a predetermined location (or in a target direction) by controlling the motor 330. Furthermore, when the sound image position rotation mode is selected, because the controller 390 rotates the first speaker 310 and the second speaker 320 at a constant speed in one direction by means of the motor 330, it may implement a stereophonic sound in all directions.

The controller 390 may apply a network function to control sound outputs of the first speaker 310 and the second speaker 320. Herein, the network function refers to dividing a sound region which divides and outputs a crossover frequency for each speaker in a multi-unit scheme. As shown in FIG. 6, a sound pressure difference and an impedance difference may be desired through a fourth-order network to present the best sound system.

The controller 390 may provide an echo cancelling function. The controller 390 may interwork with a mobile terminal (e.g., a smartphone or the like) to provide the echo cancelling function. The controller 390 may play music transmitted from a mobile terminal, a vehicle terminal, or the like or a voice signal according to a phone call and may output the music or the voice signal to the first speaker 310 and the second speaker 320. At this time, the controller 390 may output music or a voice with clear sound quality using the echo cancelling function.

The controller 390 may receive riding information in the vehicle, for example, the number of passengers, seating positions of the passengers, and the like, which is transmitted from the vehicle terminal through the communication circuit 370. The controller 390 may determine a control mode based on the number of passengers included in the riding information in the vehicle. When the number of the passengers is less than or equal to two, the controller 390 may determine the control mode as the sound image position fixing mode. When the number of the passengers is greater than two, the controller 390 may determine the control mode as the sound image position rotation mode.

The controller 390 may determine a sound image position based on the control mode and the seating position. When the control mode is determined as the sound image position fixing mode, the controller 390 may determine a sound image position (or a target direction) with regard to the seating position. When the sound image position is determined, the controller 390 may control the motor 330 to rotate and fix the first speaker 310 and the second speaker 320 such that the first speaker 310 and the second speaker 320 face the determined sound image position. In other words, the controller 390 may set the determined sound image position to the target direction and may control the motor 330 to radiate (or output) a sound in the target direction, thus adjusting a sound radiation direction of the first speaker 310 and the second speaker 320.

When the control mode is determined as the sound image position rotation mode, the controller 390 may rotate the motor 330 at a predetermined speed in one direction, such that the first speaker 310 and the second speaker 320 rotate and radiate (or emit) a sound to all seats in the vehicle.

Figure 7:
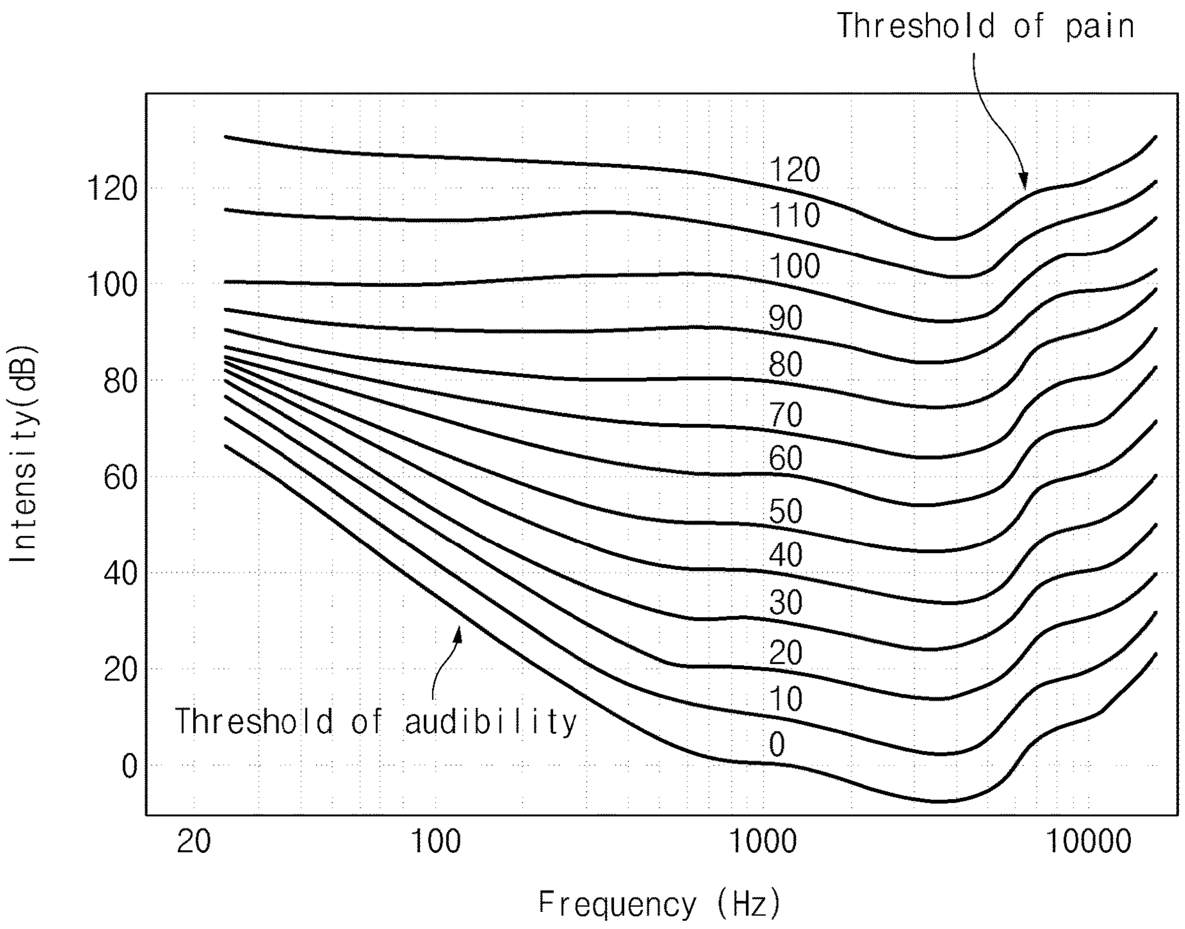
FIG. 7 is a drawing for describing criteria for setting a mounting height of a smart speaker associated with embodiments of the present disclosure.

FIG. 7 is a drawing for describing criteria for setting a mounting height of a smart speaker associated with embodiments of the present disclosure.

The criteria for setting the mounting height of a smart speaker 100 or 300 of FIG. 1 or 5 are as follows. A first criterion may be to determine the mounting height of the smart speaker 100 or 300 with reference to the Fletcher-Munson graph shown in FIG. 7. The Fletcher-Munson graph is intended to compensate for that responses of frequencies are aurally differently heard as the sound increases. The interior environment of the vehicle is closed in all directions, and it is aurally designed and tuned to fit the interior considering the seat and structure. Furthermore, vehicle evaluation provides auditory compensation at the driver's right ear position. A second criterion may be to determine the mounting height of the smart speaker 100 or 300 such that a sound response is produced at a volume of 83 dB to 85 dB under the condition of a constant speed of 60 kph while driving. Herein, the reference volume (83 dB to 85 dB) may be a level where a sound is able to be determined in low and high bands well in the entire horizontal sound range. Logic which is performed in a start OFF and ON (constant speed/acceleration) state and compensates for volume with regard to a driving sound according to a speed is applied in actual car evaluation. Volume compensation logic considering a previous well-known driving sound may be applied as the compensation logic.

Figure 8:
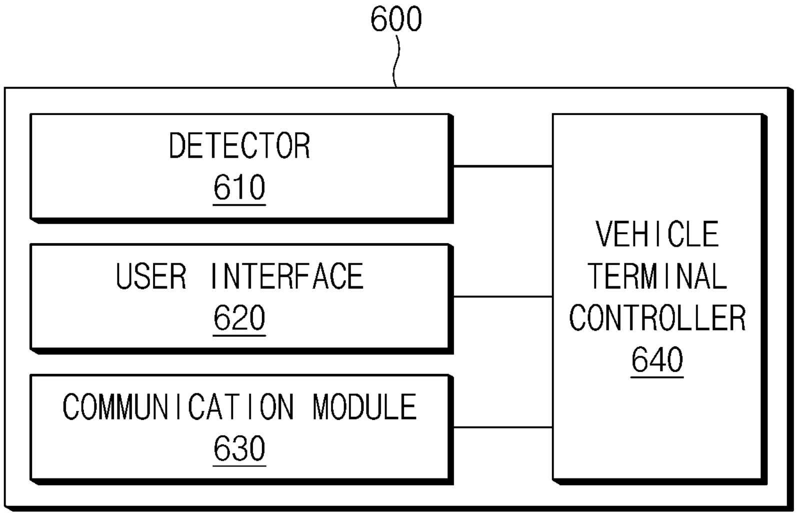
FIG. 8 is a block diagram illustrating a configuration of a vehicle terminal according to embodiments of the present disclosure.

FIG. 8 is a block diagram illustrating a configuration of a vehicle terminal according to embodiments of the present disclosure.

A vehicle terminal 600 may be an AVN, an infotainment terminal, or the like. Referring to FIG. 8, the vehicle terminal 600 may include a detector 610, a user interface 620, a communication module 630, and a vehicle terminal controller 640.

The detector 610 may detect the number of passengers in the vehicle and seating positions of the passengers using weight sensors mounted on vehicle seats or the like. The detector 610 may detect the number of passengers in the vehicle and seating positions of the passengers using an image sensor or the like except for the weight sensor.

The user interface 620 may generate data according to manipulation of a user. The user interface 620 may include at least one of devices such as a keyboard, a keypad, a touch pad, and/or a touch screen. The user interface 620 may output audible information, visual information, tactile information, and/or the like. The user interface 620 may include a display, an audio output device, a tactile signal output device, and/or the like.

The communication module 630 may assist the vehicle terminal 600 to perform communication between a smart speaker 100 or 300 of FIG. 1 or 5 and the vehicle terminal 600. The communication module 630 may be implemented as a communication circuit, a communication processor, a transceiver, and/or the like which support(s) Ethernet, Bluetooth, and the like.

The vehicle terminal controller 640 may include a processor and a memory. The vehicle terminal controller 640 may perform a pairing procedure with the smart speaker 100 or 300 through the communication module 630. The vehicle terminal controller 640 may transmit a sound source stored in a memory (not shown) to the smart speaker 100 or 300 through the communication module 630. Furthermore, the vehicle terminal controller 640 may play a sound source and may transmit the played sound source to the smart speaker 100 or 300 through the communication module 630. The vehicle terminal controller 640 may transmit riding information in the vehicle (e.g., the number of the passengers, the seating positions of the passengers, and the like), which is detected by the detector 610.

Figure 9:
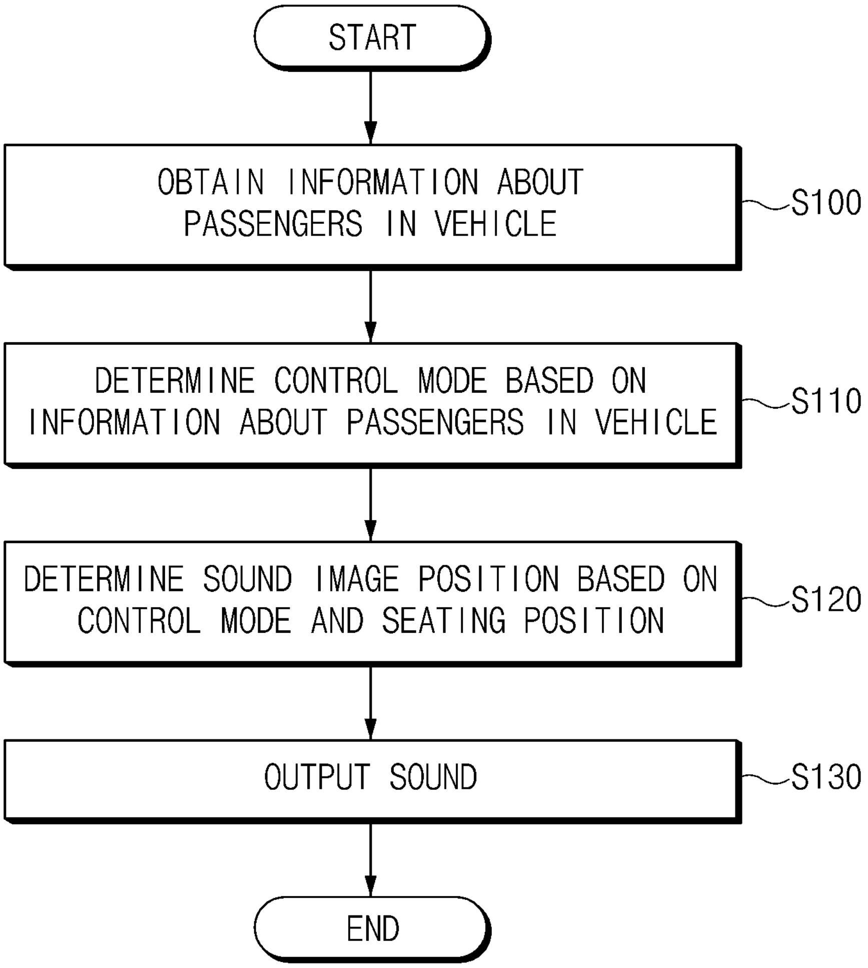
FIG. 9 is a flowchart illustrating a method for providing a sound using a smart speaker according to embodiments of the present disclosure.
Figure 10:
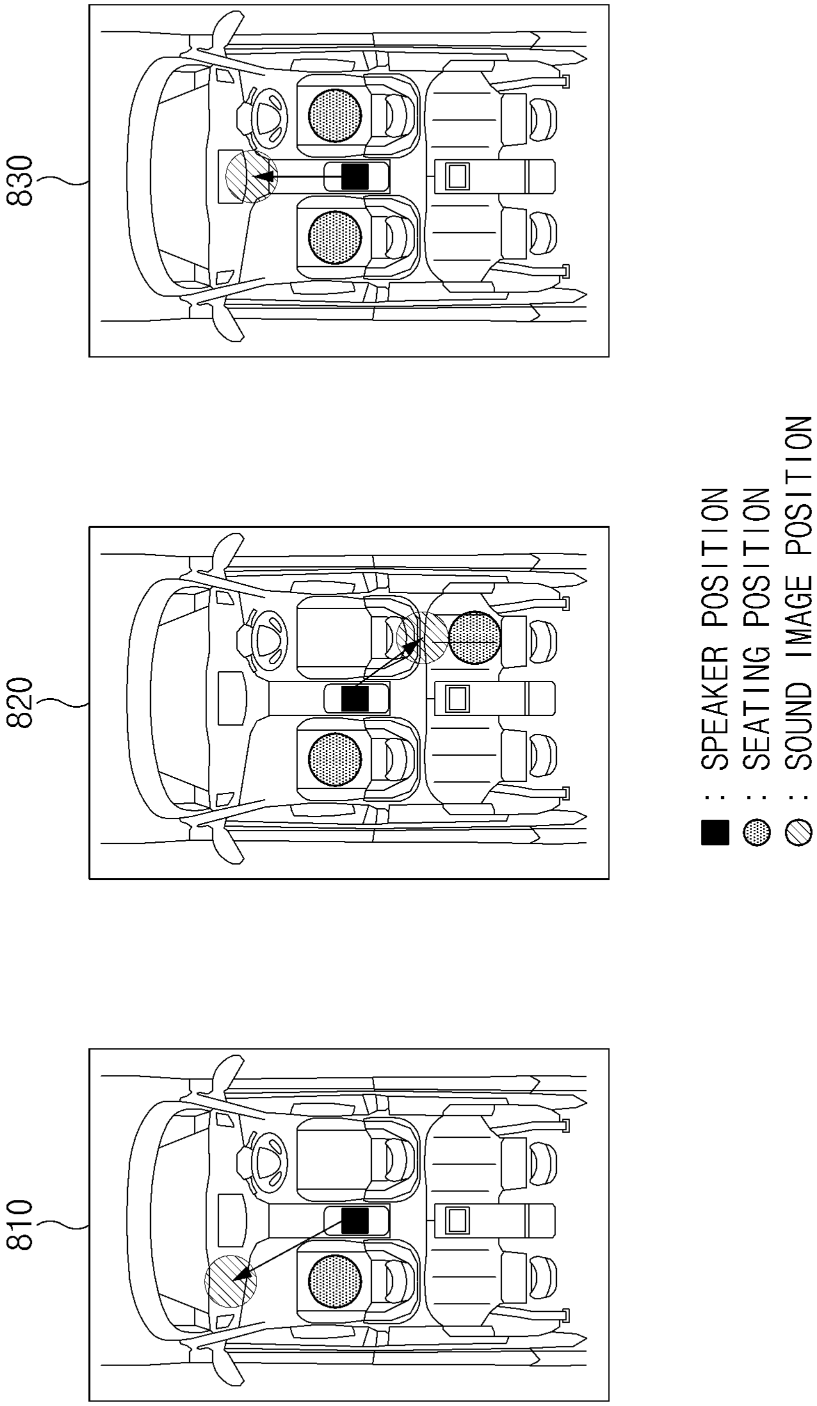
FIG. 10 is a drawing illustrating an example of providing a sound using a smart speaker according to embodiments of the present disclosure.
Figure 11:
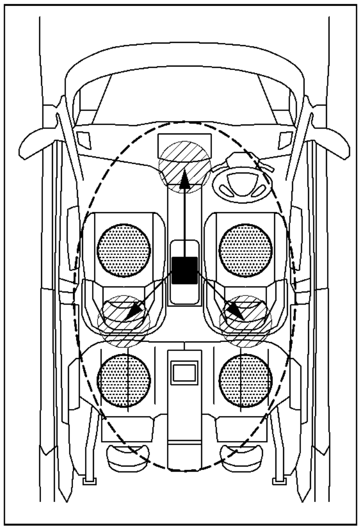
FIG. 11 is a drawing illustrating another example of providing a sound using a smart speaker according to embodiments of the present disclosure.

FIG. 9 is a flowchart illustrating a method for providing a sound using a smart speaker according to embodiments of the present disclosure. FIG. 10 is a drawing illustrating an example of providing a sound using a smart speaker according to embodiments of the present disclosure. FIG. 11 is a drawing illustrating another example of providing a sound using a smart speaker according to embodiments of the present disclosure.

A smart speaker 100 or 300 of FIG. 1 or 5 may be mounted on a console box in a vehicle. At this time, a user may turn on or off a soundscape mode using a dedicated application installed in a mobile terminal such as a smartphone. A soundscape refers to an aurally sensing environment. Herein, the soundscape mode may refer to a mode for providing a sound suitable for an environment (e.g., an interior in the vehicle, home, a hospital, an office, or the like) and/or a situation (e.g., a user emotional state, noise, concentration, sleep, or the like). When receiving a command to instruct activation of the soundscape mode, a controller 390 of FIG. 5 may perform the following procedure.

In S100, the controller 390 may obtain riding information in the vehicle. The controller 390 may receive riding information in the vehicle, for example, the number of passengers, seating positions of the passengers, and the like, which is transmitted from a vehicle terminal 600 of FIG. 8 through a communication circuit 370 of FIG. 5.

In S110, the controller 390 may determine a control mode based on the riding information in the vehicle. The controller 390 may determine the control mode based on the number of the passengers included in the riding information in the vehicle. When the number of the passengers is less than or equal to two, the controller 390 may determine the control mode as a sound image position fixing mode. When the number of passengers is greater than two, the controller 390 may determine the control mode as a sound image position rotation mode.

In S120, the controller 390 may determine a sound image position based on the control mode and the seating position. When the control mode is determined as the sound image position fixing mode, the controller 390 may determine a sound image position with regard to the seating position. For example, referring to FIG. 10, when a passenger sits on only the driver's seat (810), the controller 390 may determine the front of the driver's seat as a sound image position. Furthermore, when passengers sit on the driver's seat and the rear VIP seat (820), the controller 390 may determine a position between the passenger seat and the rear VIP seat as a sound image position. Furthermore, when passengers sit on the driver's seat and the passenger seat (830), the controller 390 may determine a front center between the driver's seat and the passenger seat as a sound image position. When the sound image position is determined, the controller 390 may control the motor 330 to rotate and fix the first speaker 310 and the second speaker 320 such that the first speaker 310 and the second speaker 320 face the determined sound image position. Meanwhile, when the control mode is determined as the sound image position rotation mode, the controller 390 may determine a sound image position in all directions. Referring to FIG. 11, when passengers sit on all seats in the vehicle, the controller 390 may determine sound image positions as a front center between the driver's seat and the passenger seat, between the passenger seat and the rear VIP seat, and between the driver's seat and the rear seat. In this case, the controller 390 may rotate a motor 330 of FIG. 5 at a predetermined speed in one direction such that the first speaker 310 and the second speaker 320 rotate.

In S130, the controller 390 may output a sound to the determined sound image position. When the sound image position is determined as one point, the controller 390 may set the image sound position to a target direction to rotate and move the first speaker 310 and the second speaker 320 in the target direction, thus radiating a sound in the target direction through the first speaker 310 and the second speaker 320. When at least two sound image positions are determined, the controller 390 may set the at least two image sound positions to target directions to rotate and move the first speaker 310 and the second speaker 320 in the target directions and may output a sound in the target directions through the first speaker 310 and the second speaker 320 to provide a stereophonic sound to all seats in the vehicle.

Embodiments of the present disclosure may apply a smart speaker, which rotates a tweeter disposed at an incline and a hybrid woofer in which a mid-range speaker and a subwoofer are combined with each other, which is vertically disposed, with respect to a rotary shaft to radiate a sound in all directions, to a vehicle, thus reducing the number of speakers mounted on the vehicle.

Furthermore, embodiments of the present disclosure may adjust a sound image position (or a target direction) of the smart speaker based on the number of passengers which ride in the vehicle and seating positions of the passengers.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, embodiments of the present invention are not intended to limit the technical spirit of the present invention, but are provided only for illustrative purposes. The scope of the present disclosure should be construed on the basis of the accompanying claims, and all the technical ideas within the scope equivalent to the claims should be included in the scope of the present disclosure.

What is claimed is:

1. A smart speaker comprising:
- a motor configured to rotate a rotary shaft;
- a speaker housing connected with the rotary shaft;
- a first speaker mounted on an inclined surface disposed on an upper end of the speaker housing;
- a second speaker mounted on a vertical surface of the speaker housing;
- a cover configured to protect the first speaker and the second speaker; and
- a controller configured to:
  - control a rotation of the first speaker and the second speaker using the motor to radiate a sound in at least one target direction;
  - determine a control mode comprising a sound image position fixing mode or a sound image position rotation mode;
  - determine the control mode as the sound image position fixing mode, when a number of passengers included in riding information in a vehicle is less than or equal to two; and
  - determine the control mode as the sound image position rotation mode, when the number of the passengers is greater than two.

2. The smart speaker of claim 1, wherein the first speaker comprises a ring radiator tweeter.

3. The smart speaker of claim 1, wherein the second speaker comprises a hybrid woofer in which a subwoofer and a mid-range speaker are combined with each other.

4. The smart speaker of claim 1, wherein the cover comprises polypropylene.

5. The smart speaker of claim 1, further comprising:

a wrinkle part disposed on the cover; and a light disposed on the wrinkle part.

6. The smart speaker of claim 1, wherein the controller is configured to determine the control mode and a sound image position based on the riding information in the vehicle.

7. The smart speaker of claim 1, wherein, when the control mode comprises the sound image position fixing mode, the controller is configured to set a sound image position to a target direction and control the first speaker and the second speaker to radiate the sound in the target direction.

8. The smart speaker of claim 1, wherein, when the control mode comprises the sound image position rotation mode, the controller is configured to set at least two sound image positions to target directions and control the first speaker and the second speaker to radiate the sound in the target directions.

9. The smart speaker of claim 1, wherein the smart speaker is mounted on a holder provided in a console box of the vehicle.

10. A method for providing a sound using a smart speaker comprising a first speaker and a second speaker rotatably installed with respect to a rotary shaft, the method comprising:

obtaining riding information in a vehicle;

determining a control mode based on the riding information in the vehicle;

determining a sound image position based on the control mode and a seating position; and controlling a sound output of the smart speaker based on the determined sound image position;

wherein determining the control mode comprises:

determining the control mode as a sound image position fixing mode, when a number of passengers included in the riding information in the vehicle is less than or equal to two; and determining the control mode as a sound image position rotation mode, when the number of the passengers is greater than two.

11. The method of claim 10, wherein obtaining the riding information in the vehicle comprises receiving the riding information in the vehicle, the riding information being transmitted from a vehicle terminal.

12. The method of claim 10, wherein determining the sound image position comprises:

in response to determining the sound image position fixing mode, determining one sound image position based on the seating position included in the riding information in the vehicle; and in response to determining the sound image position rotation mode, determining at least two sound image positions based on the seating position.

13. The method of claim 12, wherein, in response to determining the one sound image position, controlling the sound output of the smart speaker comprises rotating and moving the first speaker and the second speaker such that the first speaker and the second speaker face the one sound image position.

14. The method of claim 12, wherein controlling the sound output of the smart speaker comprises, in response to determining the at least two sound image positions, rotating the first speaker and the second speaker such that the first speaker and the second speaker face the at least two sound image positions.

15. A smart speaker comprising:

a speaker housing;

a rotary shaft within the speaker housing;

a motor configured to rotate the rotary shaft and the speaker housing;

a first speaker mounted on an inclined surface disposed on an upper end of the speaker housing, the first speaker comprising a ring radiator tweeter;

a second speaker mounted on a vertical surface of the speaker housing, the second speaker comprising a hybrid woofer in which a subwoofer and a mid-range speaker are combined with each other;

a cover configured to protect the speaker housing, the first speaker, and the second speaker; and a controller configured to:

control a rotation of the first speaker and the second speaker using the motor to radiate a sound in at least one target direction;

determine a control mode, wherein the control mode comprises a sound image position fixing mode or a sound image position rotation mode;

determine the control mode as the sound image position fixing mode, when a number of passengers included in riding information in a vehicle is less than or equal to two; and determine the control mode as the sound image position rotation mode, when the number of the passengers is greater than two.

16. The smart speaker of claim 15, wherein the controller is configured to determine the control mode and a sound image position based on the riding information in the vehicle.

17. The smart speaker of claim 15, wherein the smart speaker is mounted on a holder provided in a console box of the vehicle.

18. The smart speaker of claim 1, wherein the rotary shaft is disposed within the speaker housing and extends away from the motor toward the upper end of the speaker housing.

19. The smart speaker of claim 15, wherein the first speaker is configured to implement a radial sound field using the rotary shaft, and wherein the second speaker is configured to implement a horizontal stereophonic sound using the rotary shaft.

20. The smart speaker of claim 15, wherein the first speaker is a high frequency tweeter.

* * * * *